Jan. 28, 1936. W. MILNE 2,029,114
STONE SAW
Filed Dec. 7, 1934
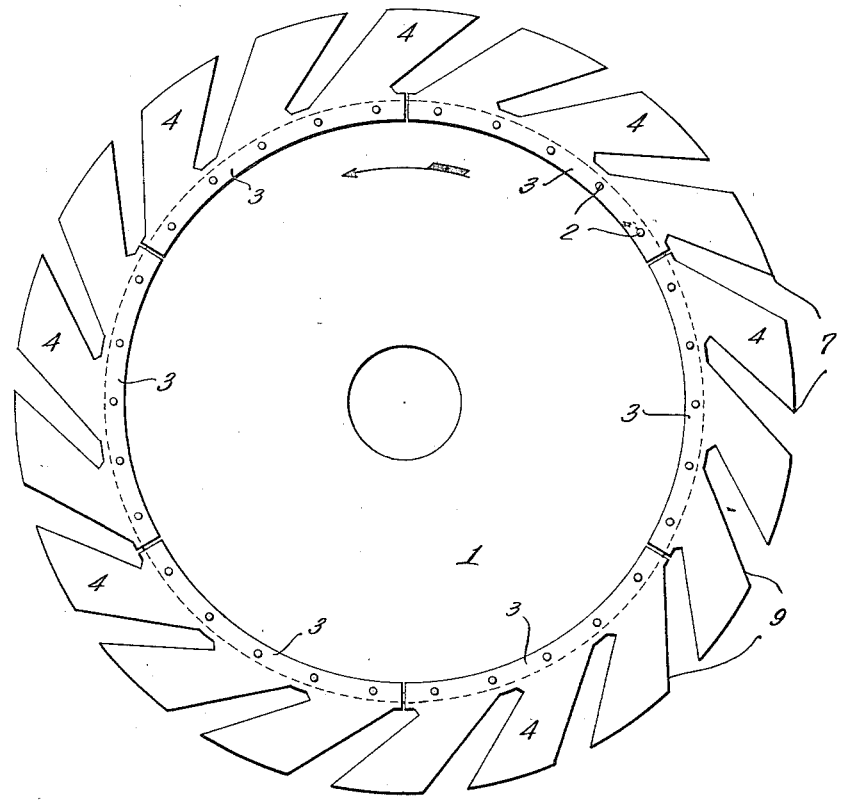
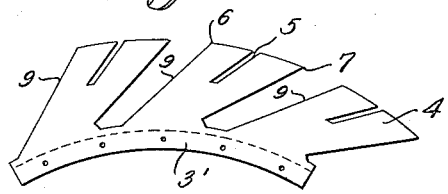
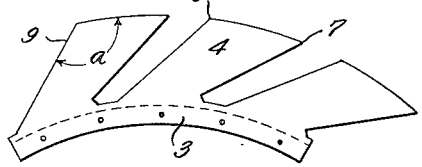
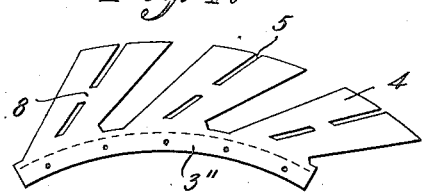
Inventor,
William Milne,
By Roberts, Cushman & Woodbury,
Attys.

Patented Jan. 28, 1936

2,029,114

UNITED STATES PATENT OFFICE 2,029,114

STONE SAW

William Milne, Barre, Vt.

Application December 7, 1934, Serial No. 756,490

6 Claims. (Cl. 125—22)

In the use of stone saws it is customary to feed shot into the kerf to reduce the wear on the saw teeth the shot feeding in through the gullets between teeth and thence under the peripheral edges of the teeth which are concentric with the axis of rotation. As manufactured heretofore saws of this type wear rapidly, require a large amount of power to drive and cut slowly.

I have discovered that these disadvantages are due largely to the tendency of the shot to squeeze out from the space between said edges and the bottom of the kerf along the sides of the teeth, this tendency continuing throughout the length of each tooth so that the number of effective shot per unit length gradually decreases from leading end to trailing end of the tooth. As a consequence the cutting efficiency decreases in like manner and, due to the scarcity of shot near the trailing end, the few remaining shot often become buried in the tooth and/or score the tooth, thereby further reducing the efficiency and rate of cutting and increasing the rate of wear and power required.

Objects of the present invention are to overcome the aforesaid objectionable characteristics of stone saws as manufactured heretofore and to provide an improved saw which cuts more rapidly, which wears more slowly and which requires less driving power.

According to the present invention the angle at the leading edge of each tooth, that is, the angle between the peripheral edge and the leading edge (the adjacent side of the preceding gullet), is made more obtuse, approximating one-third a complete circle and preferably somewhat larger, at least of the order of twice the angle between the peripheral and trailing edges, so that the shot may feed under said edge more readily.

Another important characteristic of the invention consists in a reduction of the width of the teeth (measured lengthwise of their peripheral edges) of approximately one-fourth. In the case of saws eight feet in diameter, for example, it is customary to make the teeth about thirteen inches long (measured radially of the saw) and about seventeen inches wide, whereas I find far superior results can be obtained with a width of less than thirteen inches, preferably about eleven inches, retaining the same length. Thus instead of making the teeth with a greater width than length, as is now standard practice, I employ a lesser width than length. By reducing the width of the teeth they cut effectively throughout the entire length of their peripheral edges, even though some shot does escape along the sides of the teeth; and with teeth of less peripheral extent of course more teeth can be accommodated on a saw of predetermined circumference.

Another feature of the present invention consists in the provision of a slot in the peripheral edge of each tooth, the slot having the same order of obliquity to said edges as the gullets between teeth. These slots tend to collect the shot escaping from the bottom of the kerf and, due to their obliquity, tend to feed the shot back to the bottom of the kerf, thereby assisting in maintaining an ample supply of shot under the trailing portion of each tooth.

For the purpose of illustration typical embodiments of the invention are shown in the accompanying drawing, in which:

Fig. 1 is a side elevation of one embodiment;

Fig. 2 is a side elevation of one set of teeth of the embodiment shown in Fig. 1;

Fig. 3 is a similar view showing a modified form of the invention; and

Fig. 4 is a similar view showing another modification.

The particular embodiment of the invention illustrated in Fig. 1 comprises the usual saw blade 1 having a crcumferential tongue of reduced thickness which is straddled by the bifurcated teeth in the usual manner, the teeth being attached to this tongue by means of rivets 2. As illustrated each of the tooth sections 3 comprises three teeth 4. The modification shown in Fig. 3 is like that shown in Figs. 1 and 2 except in that each tooth is provided with a peripheral slot 5 intermediate its leading and trailing corners 6 and 7. In the modification shown in Fig. 4 the slots extend substantially the full length of the teeth and are interrupted by integral bridges 8 intermediate their opposite ends, it being understood that the inner ends of the slots become operative only after the teeth have worn off beyond the bridges 8.

In each of the embodiments the angle $a$ between the peripheral and leading edges of each tooth is at least approximately twice the angles between the peripheral and trailing edges, whereby the forward edge 9 of each tooth tends to throw the shot to the bottom of the kerf as the saw rotates in the direction of the arrow in Fig. 1.

As above explained the width of the teeth is much less than usual so that even though some of the shot escapes from the bottom of the kerf along the sides of the teeth as it rolls along the peripheral edges of the teeth enough shot will travel the full length of the peripheral edge of each tooth to cause the tooth to cut effectively throughout its entire length and to prevent the shot from becoming embedded in and/or scoring the peripheral edge near its trailing end. By providing the slots as shown in Figs. 3 and 4 some of the escaping shot is caught and returned for use under the peripheral edge of each tooth, partly by centrifugal force and partly by the camming action of the inclined trailing edges of the slots. The length of the peripheral edge of each tooth is less than the radial dimension of the tooth section and preferably less than the length of the tooth.

The increased obliquity of the teeth not only serves to feed more shot under the teeth but it also enables me to make the teeth more narrow without decreasing their length. Narrow teeth projecting radially would tend to chatter and break off but by inclining them to the extent herein disclosed the inward thrust on the peripheral edges is directed transversely of the longitudinal dimensions of the teeth to such extent as to avoid this tendency, even in the extreme case of teeth which have less width than length.

By making the teeth in sections each comprising a plurality of teeth, the teeth are more rigid and may be aligned with each other, in attaching them to the blade, with greater facility and accuracy.

I have found that saws made according to this invention possess the following advantages over the best saws heretofore available: They cut about twenty-five percent faster, they require about ten percent less power and they last much longer. I have also found that my new saws cut straighter, presumably due to more perfect rolling contact throughout the entire length of the peripheral edge of each tooth and a consequent reduction in the force required to feed the saw through the stock, whereby the saw has less tendency to buckle.

It should be understood that the present disclosure is for the purpose of illustration only and that this invention includes all modifications and equivalents which fall within the scope of the appended claims.

I claim:

1. A stone saw comprising a circular blade having teeth projecting from the periphery thereof with gullets therebetween, the teeth being outwardly inclined in the direction opposite to the direction of rotation and having similarly inclined slots in said peripheral edges, said slots extending inwardly approximately as far as the gullets but being interrupted by bridges integral with the teeth respectively.

2. A stone saw comprising a circular blade, tooth sections each comprising a plurality of teeth integrally connected at their bases, and means for attaching said sections to the blade, the angles between the peripheral and leading edges of the teeth being more than twice the angles between the peripheral and trailing edges, the length of said peripheral edges being less than the radial dimension of said sections, and the teeth having slots in said peripheral edges extending substantially the full length of the teeth with integral bridges interrupting the slots intermediate their ends.

3. A stone saw comprising a circular blade having sets of integrally connected teeth projecting from the periphery thereof at an angle inclined in the direction opposite to the direction of rotation, the teeth tapering from their outer ends toward their bases at such angles that the ratio of circumferential width of teeth to circumferential width of gullets is approximately the same at different radii throughout the operative length of the teeth, said ratio being approximately two to one, the angle between the circumferential and leading edge of each tooth being at least of the order of one-third of a complete circle, and the circumferential dimension of each of said sets being greater than the radial dimension thereof.

4. A stone saw comprising a circular blade having sets of integrally connected teeth projecting from the periphery thereof at an angle inclined in the direction opposite to the direction of rotation, the teeth and intermediate gullets tapering from their outer ends toward their bases at such angles that the ratio of circumferential width of teeth to circumferential width of gullets is approximately the same at different radii throughout the operative length of the teeth, said ratio being approximately two to one, the angle between the circumferential and leading edge of each tooth being at least of the order of one-third of a complete circle, and the circumferential dimension of each of said sets being greater than the radial dimension thereof.

5. A stone saw comprising a circular blade having sets of integrally connected teeth projecting from the periphery thereof at an angle inclined in the direction opposite to the direction of rotation, the teeth tapering from their outer ends toward their bases at such angles that the ratio of circumferential width of teeth to circumferential width of gullets is approximately the same at different radii throughout the operative length of the teeth, said ratio being approximately two to one, the angle between the circumferential and leading edge of each tooth being at least of the order of one-third of a complete circle, the circumferential width of the peripheral edge of each tooth being confined to an upper limit of approximately thirteen inches, and the circumferential dimension of each of said sets being greater than the radial dimension thereof.

6. A stone saw comprising a circular blade having sets of integrally connected teeth projecting from the periphery thereof at an angle inclined in the direction opposite to the direction of rotation, the teeth and intermediate gullets tapering from their outer ends toward their bases at such angles that the ratio of circumferential width of teeth to circumferential width of gullets is approximately the same at different radii throughout the operative length of the teeth, said ratio being approximately two to one, the angle between the circumferential and leading edge of each tooth being at least of the order of one-third of a complete circle, the circumferential width of the peripheral edge of each tooth being confined to an upper limit of approximately thirteen inches, and the circumferential dimension of each of said sets being greater than the radial dimension thereof.

WILLIAM MILNE.